Nov. 11, 1930.  C. G. GOODRICH  1,781,278
FERTILIZER DISTRIBUTOR
Filed Feb. 4, 1929
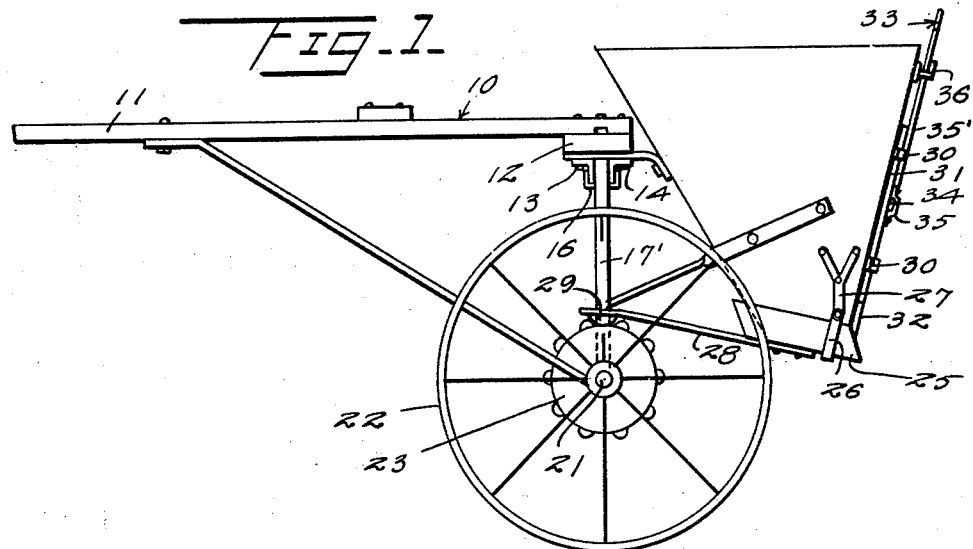
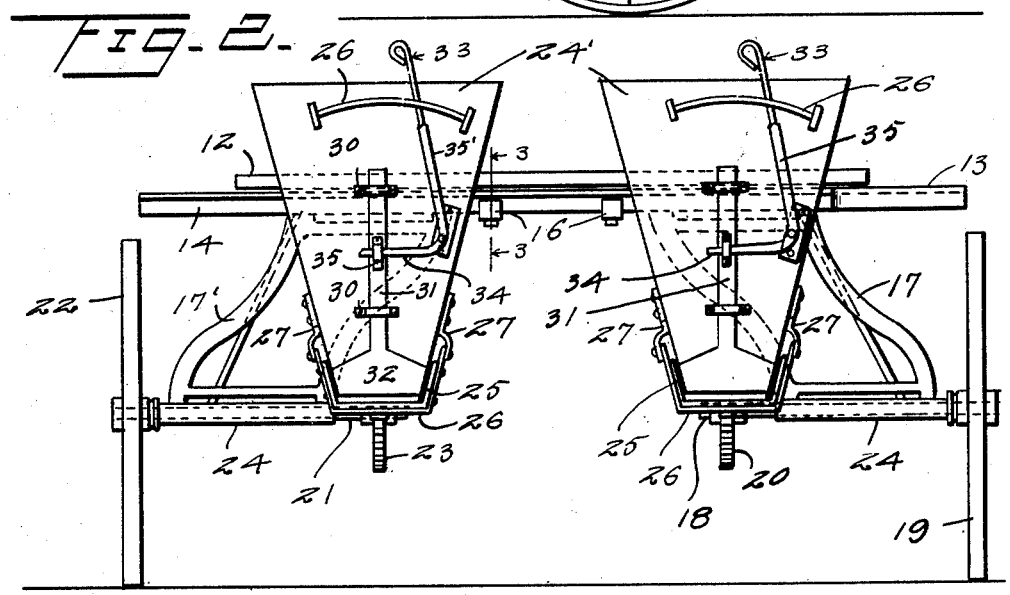
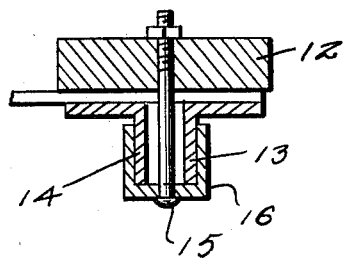
Inventor
C. G. Goodrich
By Horace C. Sandler
Attorney Patented Nov. 11, 1930

1,781,278

UNITED STATES PATENT OFFICE

CEPHUS G. GOODRICH, OF WAKEFIELD, VIRGINIA

FERTILIZER DISTRIBUTOR

Application filed February 4, 1929. Serial No. 337,376.

This invention relates to new and useful improvements in fertilizer distributors.

Devices of this character generally have two or more fertilizer hoppers arranged side-by-side, and so mounted that they may be adjusted toward and away from each other, in accordance with the varying distances between the rows. Also, such devices have bottoms to their hoppers which are vibrated or shaken by some mechanism, which is actuated by the ground supporting wheels of the machine, and it is with particular reference to this bottom, and the shaking mechanism therefore, that I have provided a particularly novel and improved structure.

One object of the present invention is to provide a novel means by which the vibrating mechanism may be adjusted at the same time as the hoppers, so as not to interfere with the proper operation of the vibrating mechanism.

Another object is to provide a distributor of this character wherein the vibrator arm is operable from a point in front of the hoppers, instead of from the rear, with the result that the hoppers may be properly located rearwardly of the ground wheels of the machine.

Other objects and advantages will be apparent from the following description when taken in connection with the accompanying drawing.

In the drawing:

Figure 1 is a side elevation of a fertilizer distributor made in accordance with the present invention.

Figure 2 is a rear elevation of the same.

Figure 3 is an enlarged vertical sectional view on the line 3—3 of Figure 2.

Referring particularly to the accompanying drawings, there is shown a frame 10, which includes the draft tongues 11, and the rear transverse beam 12. Slidably supported on the lower face of the beam 12, are the substantially L-shaped bars 13 and 14, said bars being arranged with their horizontal webs extending away from each other. Disposed between the bars 13 and 14, transversely thereof, are the bolts 15, the headed ends of which are passed through a channeled bar 16, which receives in its channel the outer edges of the vertical webs of the bars 13 and 14. Carried by the bar 13 is a depending frame 17, and mounted on the lower end of said frame is a horizontal shaft 18. On the outer end of the shaft 18 there is mounted the ground wheel 19, while on the inner end thereof is mounted the toothed wheel 20. Carried by the bar 14 is a depending frame 17', and mounted on lower end of said frame is a horizontal shaft 21, similar to the shaft 18, and carrying on one end a ground wheel 22, corresponding to the wheel 19, while the other end of the shaft is provided with a toothed wheel 23 of like construction to the toothed wheel 20. The shafts 18 and 21 are supported in the casings or sleeves 24—24, on the frames 17 and 17'. Mounted on each of the bars 13 and 14 is a hopper 24', and disposed below the lower open end of each of the hoppers is a vibratable discharging bottom 25. Disposed beneath, and secured to the bottom 25, is an angular U-shaped member 26, the arms of which extend upwardly at the sides of the hopper and are pivotally connected with the brackets 27, carried by the sides of the lower end of the hopper. The rear end of the bottom 25 is open to discharge the fertilizer from the hopper, while the front end is closed. It will be noted that the toothed wheels 20 and 23 are disposed directly behind the centers of the bottoms 25, and remain in such relative positions by reason of the fact that they are adjustable with the frames and hoppers. Secured to the lower face of each bottom 25 is a forwardly and upwardly curving arm 28, which extends to a point directly over a toothed wheel, where it is provided with a block 29, on its lower face, for engagement with the periphery of the toothed wheel, whereby when the said wheel is rotated, through the medium of the ground wheels of the machine, the arm 28 will be rocked up and down to cause the proper and corresponding movement of the bottom.

On the rear face of each of the hoppers, in vertical alinement, are the guides 30, in which is slidably disposed the stem 31, of the plate valve 32, which controls the outlet of the fertilizer from the hopper, to the rear end of the bottom 25. Pivotally mounted on the rear face of the hopper, approximately midway of the length thereof, is an angle lever 33, the extremity of the arm 34, of which is loosely engaged in a guide 35, on the stem 31, while the other, or vertical arm 35', extends upwardly within an arcuate notched guide 36, said arm 35 being adapted to be sprung into and out of engagement with the different notches, for the purpose of holding the plate valve 32 at the proper position.

What is claimed is:

In a fertilizer distributor, a pair of frames each having an axle with a ground wheel and a fertilizer containing hopper, a draft means including a transverse bar, a pair of transverse angle bars disposed below the first transverse bar with their corresponding wings in parallel relation, each of said angle bars having one of said frames secured thereto, angular U-shaped members slidably receiving the said parallel wings, and bolts disposed vertically through the first bar and through said U-shaped members, between the parallel wings, for holding the angle bars in slidably adjusted positions.

In testimony whereof, I affix my signature.

CEPHUS G. GOODRICH.